US012619721B2

(12) United States Patent
Huang et al.

(10) Patent No.: US 12,619,721 B2
(45) Date of Patent: May 5, 2026

(54) METHODS AND APPARATUS FOR MALWARE CLASSIFICATION THROUGH CONVOLUTIONAL NEURAL NETWORKS USING RAW BYTES

(71) Applicant: McAfee, LLC, San Jose, CA (US)

(72) Inventors: Yonghong Huang, Hillsboro, OR (US);
Steven Grobman, Plano, TX (US);
Jonathan King, Hillsboro, OR (US);
Craig Schmugar, Hillsboro, OR (US);
Abhishek Karnik, Hillsboro, OR (US);
Celeste Fralick, Lubbock, TX (US);
Vitaly Zaytsev, Hillsboro, OR (US)

(73) Assignee: McAfee, LLC, San Jose, CA (US)

(*) Notice: Subject to any disclaimer, the term of this patent is extended or adjusted under 35 U.S.C. 154(b) by 362 days.

(21) Appl. No.: 17/714,033

(22) Filed: Apr. 5, 2022

(65) Prior Publication Data

US 2022/0318383 A1    Oct. 6, 2022

Related U.S. Application Data

(60) Provisional application No. 63/170,647, filed on Apr. 5, 2021.

(51) Int. Cl.
| | |
|---|---|
| *G06F 21/56* | (2013.01) |
| *G06N 3/0464* | (2023.01) |
| *G06N 3/08* | (2023.01) |
| *G06N 3/09* | (2023.01) |

(52) U.S. Cl.
CPC .............. *G06F 21/56* (2013.01); *G06N 3/08* (2013.01); *G06F 2221/034* (2013.01)

(58) Field of Classification Search
CPC .. G06F 21/56; G06F 2221/034; G06F 21/564; G06N 3/08; G06N 3/0464; G06N 3/09
See application file for complete search history.

(56) References Cited

U.S. PATENT DOCUMENTS

| | | | | |
|---|---|---|---|---|
| 11,210,392 B2 * | 12/2021 | Salem | .................. | G06F 21/564 |
| 11,675,816 B1 * | 6/2023 | Chandrasekharan | ... | G06F 11/30 |
| | | | | 707/737 |
| 2019/0108442 A1 * | 4/2019 | Chang | .................... | G06N 3/045 |
| 2019/0138722 A1 * | 5/2019 | Krcál | .................... | H04W 12/12 |
| 2021/0141897 A1 * | 5/2021 | Seifert | .................. | G06F 21/561 |
| 2022/0147628 A1 * | 5/2022 | Abu Alhaol | ........... | G06N 3/045 |
| 2022/0156563 A1 * | 5/2022 | Zhang | .................... | G06N 3/082 |

(Continued)

OTHER PUBLICATIONS

M. Krcal et al., "Deep Convolutional Malware Classifiers Can Learn From Raw Executables and Labels Only", ICLR 2018, retrieved from https://openreview.net/pdf?id=HkHrmM1PM, 4 pages.

*Primary Examiner* — Andrew Suh
(74) *Attorney, Agent, or Firm* — Hanley, Flight & Zimmerman, LLC

(57) ABSTRACT

Methods, apparatus, systems, and articles of manufacture are disclosed. An example apparatus includes at least one memory, instructions; and processor circuitry to execute the instructions to train a neural network with a plurality of raw byte data samples, perform feature extraction on ones of the plurality of raw byte data samples, determine whether ones of the plurality of raw byte data samples are clean or malicious using the extracted features, and determine a family of malware to which an identified malicious sample belongs.

21 Claims, 18 Drawing Sheets

(56)              References Cited

U.S. PATENT DOCUMENTS

2023/0021444 A1 *   1/2023   Lim ......................... G06T 5/70
2023/0221684 A1 *   7/2023   Kloepper .............. G06N 5/045
                                                      700/28

* cited by examiner

100

BEFORE TRAINING (T-SNE, PCA)

| CLASS | FAMILY | COUNT |
|-------|--------------|-------|
| 0 | CLEAN | 861 |
| 1 | FAREIT | 2849 |
| 2 | EMOTET | 912 |
| 3 | OAKBOT | 577 |
| 4 | AGENTTESLA | 1875 |
| 5 | SODINIKIBI | 504 |
| 6 | OTHERS | 2538 |

AFTER TRAINING (T-SNE, PCA)

| CLASS | FAMILY | COUNT |
|---|---|---|
| 0 | CLEAN | 861 |
| 1 | FAREIT | 2849 |
| 2 | EMOTET | 912 |
| 3 | QAKBOT | 577 |
| 4 | AGENTTESLA | 1875 |
| 5 | SODINIKIBI | 504 |
| 6 | OTHERS | 2538 |

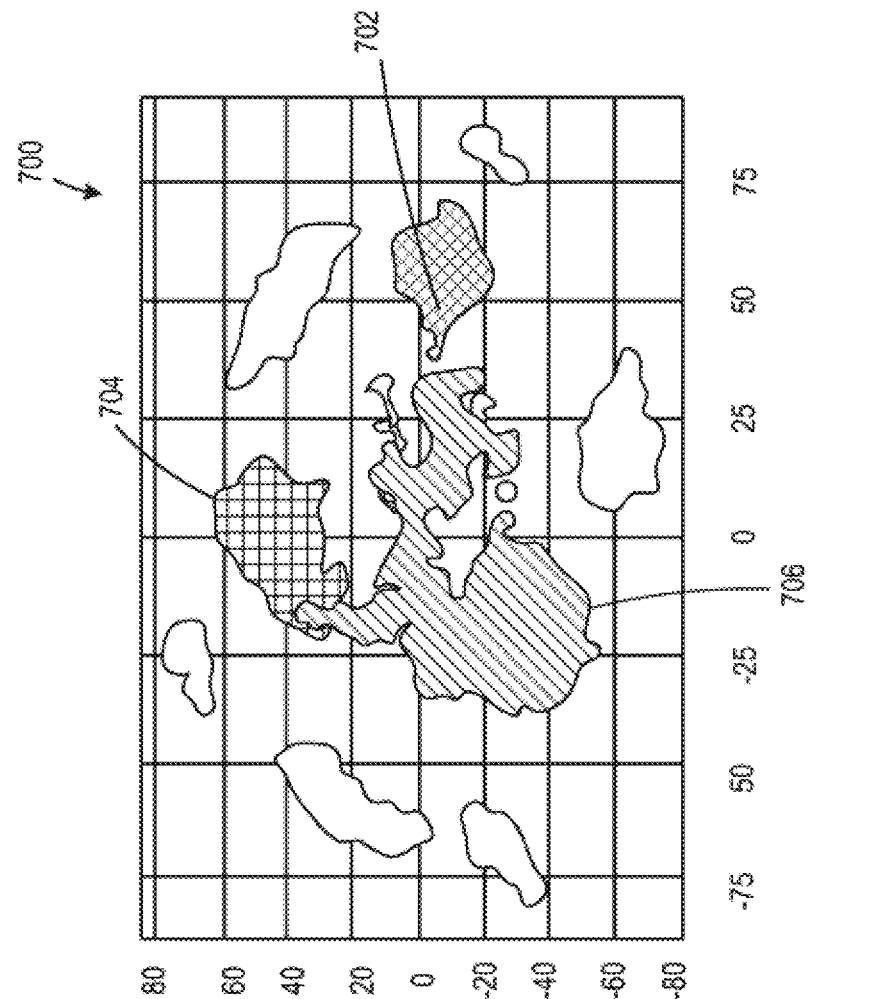
FIG. 7
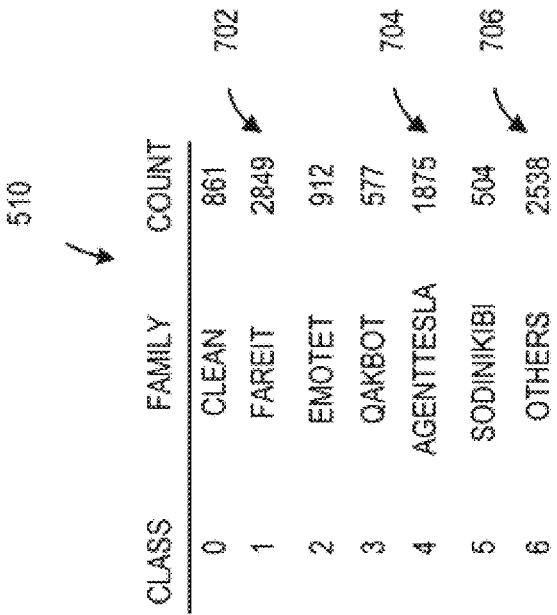

1300

START

RECEIVE RAW BYTE DATA SAMPLES FOR TRAINING — 1302

TRAIN NEURAL NETWORK — 1304

PERFORM FEATURE EXTRACTION ON DATA SAMPLES — 1306

SAMPLE CLASSIFICATION TO BE PERFORMED? — 1308

NO

YES

OUTPUT DATA SAMPLE CLASSIFICATION — 1310

OUTPUT MALWARE FAMILY CLASSIFICATION — 1312

OUTPUT EXTRACTED FEATURES — 1314

END

METHODS AND APPARATUS FOR MALWARE CLASSIFICATION THROUGH CONVOLUTIONAL NEURAL NETWORKS USING RAW BYTES

RELATED APPLICATION

This patent arises from a continuation of U.S. Patent Application Ser. No. 63/170,647, which was filed on Apr. 5, 2021. U.S. Provisional Patent Application No. 63/170,647 is hereby incorporated herein by reference in its entirety. Priority to U.S. Provisional Patent Application No. 63/170, 647 is hereby claimed.

FIELD OF THE DISCLOSURE

This disclosure relates generally to malware classification and, more particularly, to methods and apparatus for malware classification through convolutional neural networks (CNNs) using raw bytes.

BACKGROUND

The introduction of malware into regular software has grown rapidly over the recent years. The ability to classify and categorize malware and benign software is an important function of security programs. Polymorphic malware refers to malware that can change appearance and/or signature files in order to avoid detection. When training a machine learning (ML) model to be able to distinguish between malicious and clean software, an ability to process polymorphic malware is important for ensuring accuracy of sample classification by the machine learning model in deployment.

BRIEF DESCRIPTION OF THE DRAWINGS

FIG. 7 shows a last-layer t-SNE plot visualizing output of the neural network after training is complete.

The figures are not to scale. Instead, the thickness of the layers or regions may be enlarged in the drawings. In general, the same reference numbers will be used throughout the drawing(s) and accompanying written description to refer to the same or like parts.

Figure 1A:
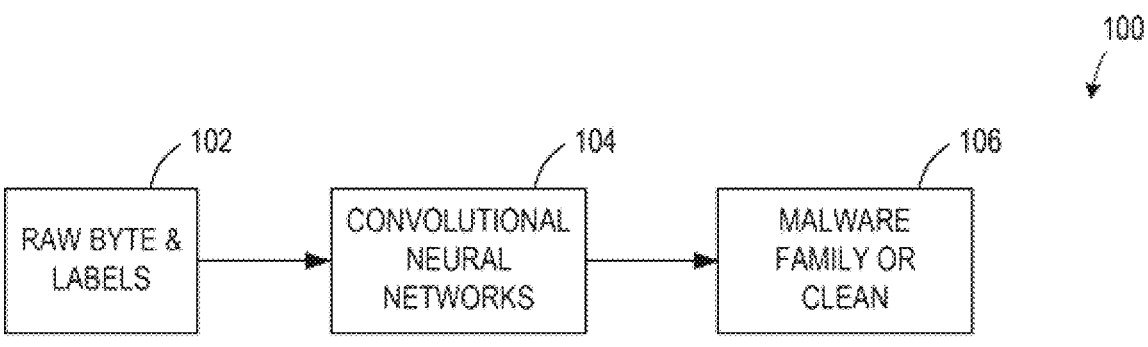
FIGS. 1A-1C are block diagrams of an example raw byte classification system to classify samples as clean or malicious and/or to extract features.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations when processing input data such that other input(s) result in output(s) consistent with the recognized patterns and/or associations.

Many different types of machine learning models and/or machine learning architectures exist. In some examples disclosed herein, a convolutional neural network (CNN) is used. Using a CNN model enables the interpretation of data that is simple and explainable. In general, machine learning models/architectures that are suitable to use in the example approaches disclosed herein will be Convolutional Neural Network (CNN) and/or Deep Neural Network (DNN), wherein interconnections are not visible outside of the model. However, other types of machine learning models could additionally or alternatively be used such as Recurrent Neural Network (RNN), Support Vector Machine (SVM), Gated Recurrent Unit (GRU), Long Short Term Memory (LSTM), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Figure 1B:
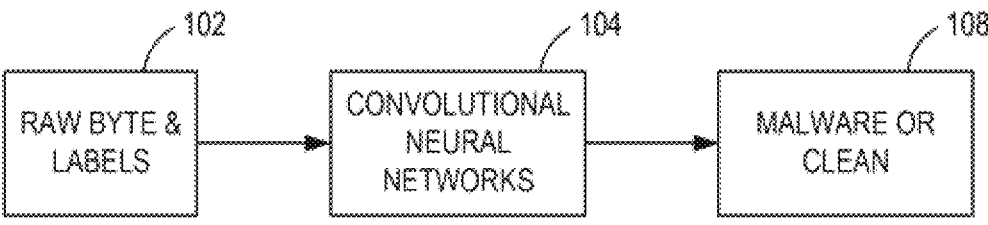

In examples disclosed herein, ML/AI models are trained using raw byte data (e.g., raw bytes of malware and/or clean samples). However, any other training algorithm may additionally or alternatively be used. In examples disclosed herein, training is performed on a raw byte classification system 100 as shown in FIGS. 1A, 1B, and/or 1C.

Training is performed using hyperparameters that control how the learning is performed (e.g., a learning rate, a number of layers to be used in the machine learning model, etc.).

Training is performed using training data. In examples disclosed herein, the training data may be any type of dataset of malicious and/or clean software samples.

Once training is complete, the model is deployed for use as an executable construct that processes an input and provides an output based on the network of nodes and connections defined in the model. The model is stored in a memory. The model may then be executed by the malware raw byte classification circuitry 300 of FIG. 3.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

A major challenge for malware detection lies in dealing with a vast number of samples for classification. A key reason for such high volumes of samples and/or different files is polymorphism, which refers to malware that changes appearance and/or signature files in order to avoid detection. Attackers are motivated to evade detection and introduce polymorphic malware, which results in each sample being cryptographically distinct (e.g., a simple hash-based identifier cannot be used for detection purposes). Various other forms of generic detection have become commonplace in the security industry, however, it is desired to determine not only whether a particular sample or activity is malicious, but whether or not is it similar to other known malware families. Families include the same forms of malicious behavior, although they may be constantly modified and/or obfuscated. In order to effectively classify polymorphic malware into their respective families and to detect new malware families, discriminative features that represent malware characteristics need to be effectively extracted.

Known methods for machine learning (ML) malware classification and/or detection rely on handcrafted features. Feature engineering is a very time-consuming process and handcrafted features may not generalize well to novel malware, such as polymorphic malware.

Example methods and apparatus disclosed utilize convolutional neural networks (CNNs) for malware classification using raw bytes. The CNN only takes a raw sequence of bytes and/or labels as input and requires no domain specific feature extraction and/or preprocessing. The CNN architecture and hyperparameters are also optimized for malware classification. Having the ability to classify malware at a raw byte levels allows for a more accurate building of a machine learning model for future classification of software samples, in addition to identification of polymorphic malware. Examples disclosed may utilize nonlinear activation functions such as a rectified linear unit (ReLU) activation function and a scaled exponential linear unit (SeLU) activation function, as well as data manipulation methods such as MinHash, Locality Sensitive Hashing (LSH), etc. and feature-based machine learning classifiers such as decision tree-based classifiers, etc.

Figure 1C:
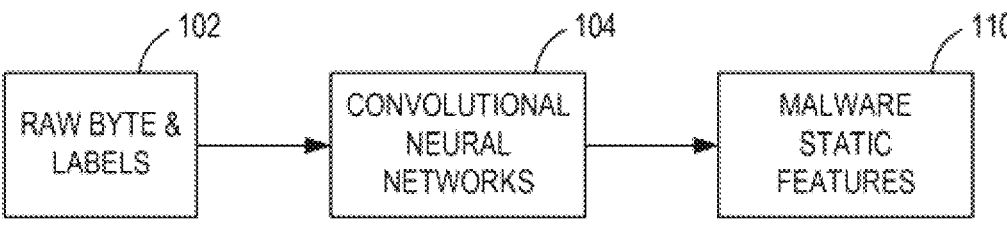

FIGS. 1A-1C are block diagrams of example implementations of a raw byte classification system 100, implemented in accordance with the teachings of the present disclosure. The example raw byte classification system 100 of FIGS. 1A-1C includes raw byte & labels input 102 that is passed into an example convolutional neural networks 104. In some examples the convolutional neural networks 104 may be a single CNN architecture that is applicable to various use cases. As shown in FIG. 1A, in examples disclosed herein, the output from the CNN 104 may be in the form of sample family classification 106 to show whether a sample is part of a specific malware or clean family. As shown in FIG. 1B, the output from the CNN 104 may alternatively be sample classification 108 indicate a classification of a sample as malware or clean. As shown in FIG. 1C, in some examples, the output from the CNN 104 may also be malware static features 110 representing a collection of extracted features that may be used as input into another machine learning (ML) algorithm and/or neural network.

Figure 2:
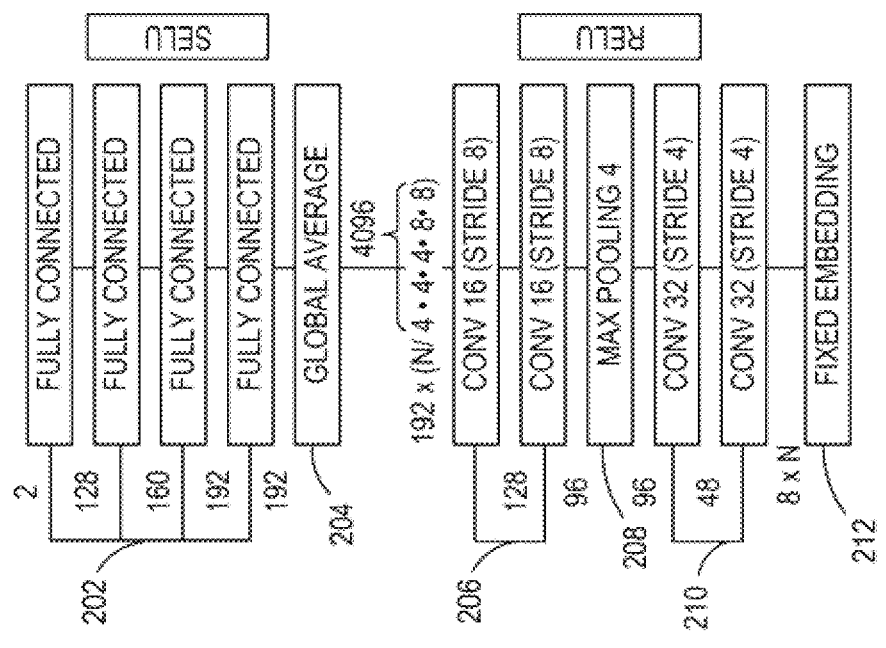
FIG. 2 is an example depiction of a neural network architecture for the example raw byte classification system of FIGS. 1A, 1B, and/or 1C.

FIG. 2 is an example depiction of a neural network architecture 200 for the CNN 104 of the example raw byte classification system 100 of FIGS. 1A-1C. The neural network architecture 200 includes a set of fully connected layers 202 (e.g., four fully connected layers 202), a global average 204, a set of first convolutional layers 206, a max pooling layer 208, a set of second convolutional layers 210, and a fixed embedding layer 212. The CNN 104 takes raw bytes and/or labels as input, and as illustrated in the neural network architecture 200, discriminative representations of this input is learned through the set of first and second convolutional layers, 206 and 208, respectively.

The set of training data for the machine learning model. The example dataset 200 illustrates an average 210 of the data points. Example data points 205A, 205B, and 205C represent data samples that, in examples disclosed herein, are positioned far enough away from the average 210 to be deemed noise and thus omitted from training when feature-based machine learning classifiers are used. In examples disclosed herein, a rectified linear unit (ReLU) activation function may be used as a nonlinear activation function for learning of the set of first and second convolutional layers, 206 and 208, respectively, and a scaled exponential linear unit (SeLU) activation function may be used as a nonlinear activation function for learning of the set of fully connected layers 202. In examples disclosed herein, output size of the last convolutional layer of the second set of convolutional layers 208 may be 192. These 192 extracted features can be fed into a separate machine learning classifier for malware classification. In examples disclosed herein, the CNN 104 of FIGS. 1A-1C serves as a feature extractor. The example global average layer 204 is used to generate example feature maps for feature extraction, and the example fixed embedding layer 212 is used to represent extracted features (e.g., in a vector, etc.).

Figure 3:
FIG. 3 is a block diagram of an example implementation of the raw byte classification system of FIGS. 1A-1C.

FIG. 3 is a block diagram of an example implementation of the raw byte classification system 100 of FIG. 1. In examples disclosed herein, example raw byte classification circuitry 300 includes example input receiving circuitry 305, example pre-process visualization circuitry 310, example neural network training circuitry 315, example feature extraction circuitry 320, example sample classification circuitry 325, example malware family classification circuitry 330, and example post-process visualization circuitry 335. Example data samples 302 are depicted in conjunction with the raw byte classification circuitry 300, these data samples 302 represent possible raw byte and/or label input that may be used for training and/or classification.

The example input receiving circuitry 305 obtains raw byte and/or label data samples to be used as input for training of the neural network (e.g., CNN 104 of FIG. 1). In examples disclosed herein, the input receiving circuitry 305 may obtain samples from the data samples 302 database, however, any other data source may be used to obtain inputs.

In some examples, the raw byte classification circuitry 300 of FIG. 3 includes means for obtaining raw byte data samples for training of a neural network. For example, the means for obtaining raw byte data samples for training of a neural network may be implemented by input receiving circuitry 305. In some examples, the input receiving circuitry 305 may be implemented by machine executable instructions such as that implemented by at least block 1302 of FIG. 13 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the input receiving circuitry 305 is implemented by other hardware logic circuitry, hardware implemented state machines, and/or any other combination of hardware, software, and/or firmware. For example, the input receiving circuitry 305 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example pre-process visualization circuitry 310 uses the input data samples obtained by the input receiving circuitry 305 to perform pre-process visualizations. In examples disclosed herein, the pre-process visualizations may include t-SNE plots, PCA plots, etc.

In some examples, the raw byte classification circuitry 300 of FIG. 3 includes means for performing pre-process visualizations of data samples. For example, the means for performing pre-process visualization of data samples may be implemented by pre-process visualization circuitry 310. In some examples, the pre-process visualization circuitry 310 may be implemented by machine executable instructions such as that implemented by the example processor circuitry 1412 of FIG. 14, the example processor circuitry 1500 of FIG. 15, and/or the example Field Programmable Gate Array (FPGA) circuitry 1600 of FIG. 16. In other examples, the pre-process visualization circuitry 310 is implemented by other hardware logic circuitry, hardware implemented state machines, and/or any other combination of hardware, software, and/or firmware. For example, the pre-process visualization circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example neural network training circuitry 315 uses the inputs received by the input receiving circuitry 305 to train a neural network (e.g., CNN 104 of FIGS. 1A-1C). In examples disclosed herein, any type of neural network training algorithm may be used to train the neural network.

In some examples, raw byte classification circuitry 300 of FIG. 3 includes means for training a neural network using raw byte inputs. For example, the means for training a neural network using raw byte inputs may be implemented by neural network training circuitry 315. In some examples, the neural network training circuitry 315 may be implemented by machine executable instructions such as that implemented by at least block 1304 of FIG. 13 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the neural network training circuitry 315 is implemented by other hardware logic circuitry, hardware implemented state machines, and/or any other combination of hardware, software, and/or firmware. For example, the neural network training circuitry 315 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example feature extraction circuitry 320 performs feature extraction on the trained neural network. In examples disclosed herein, any type of traditional feature-based classifier may be used to perform feature extraction on data samples.

In some examples, raw byte classification circuitry 300 of FIG. 3 includes means for performing feature extraction on the trained neural network. For example, the means for performing feature extraction on the trained neural network may be implemented by feature extraction circuitry 320. In some examples, the feature extraction circuitry 320 may be implemented by machine executable instructions such as that implemented by at least block 1314 of FIG. 13 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the feature extraction circuitry 320 is implemented by other hardware logic circuitry, hardware implemented state machines, and/or any other combination of hardware, software, and/or firmware. For example, the feature extraction circuitry 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example sample classification circuitry 325 classifies data samples using the trained neural network and extracted features. In examples disclosed herein, any type of traditional feature-based classifier may be used to classify the data samples. Binary classification is performed on the data samples to produce a result of either clean or malicious.

In some examples, the raw byte classification circuitry 300 of FIG. 3 includes means for performing feature-based classification of data samples using the trained neural network. For example, the means for performing feature-based classification of data samples using the trained neural network may be implemented by sample classification circuitry 325. In some examples, the sample classification circuitry 325 may be implemented by machine executable instructions such as that implemented by at least block 1310 of FIG. 13 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the sample classification circuitry 325 is implemented by other hardware logic circuitry, hardware implemented state machines, and/or any other combination of hardware, software, and/or firmware. For example, the sample classification circuitry 325 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example malware family classification circuitry 330 uses the extracted features and the trained neural network to determine whether a sample is malicious or clean. Once a sample is determined to be malicious, the malware family classification circuitry 330 determines a malware family to which the malicious data sample belongs. In examples disclosed herein, a traditional feature-based classifier may be used to perform this classification.

In some examples, the raw byte classification circuitry 300 of FIG. 3 includes means for determining a malware family classification for data samples. For example, the means for determining a malware family classification for data samples may be implemented by malware family classification circuitry 330. In some examples, the malware family classification circuitry 330 may be implemented by machine executable instructions such as that implemented by at least block 1312 of FIG. 13 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the malware family classification circuitry 330 is implemented by other hardware logic circuitry, hardware implemented state machines, and/or any other combination of hardware, software, and/or firmware. For example, the malware family classification circuitry 330 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example post-process visualization circuitry 335 performs post-classification and/or feature extraction visualization on the data samples. In examples disclosed herein, visualization may be performed using t-SNE plots, PCA plots, etc.

In some examples, the raw byte classification circuitry 300 of FIG. 3 includes means for performing post-process visualization of the classified data samples. For example, the means for performing post-process visualization of the classified data samples may be implemented by post-process visualization circuitry 335. In some examples, the post-process visualization circuitry 335 may be implemented by machine executable instructions, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the post-process visualization circuitry 335 is implemented by other hardware logic circuitry, hardware implemented state machines, and/or any other combination of hardware, software, and/or firmware. For example, the post-process visualization circuitry 335 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the raw byte classification circuitry 300 is illustrated in FIG. 3, one or more of the elements, processes, and/or devices illustrated in FIG. 3 may be combined, divided, re-arranged, omitted, eliminated, and/or implemented in any other way. Further, the example input receiving circuitry 305, the example pre-process visualization circuitry 310, the example neural network training circuitry 315, the example feature extraction circuitry 320, the example sample classification circuitry 325, the example malware family classification circuitry 330, the example post-process visualization circuitry 335, and/or, more generally, the example raw byte classification circuitry 300 of FIG. 3, may be implemented by hardware, software, firmware, and/or any combination of hardware, software, and/or firmware. Thus, for example, any of the example input receiving circuitry 305, the example pre-process visualization circuitry 310, the example neural network training circuitry 315, the example feature extraction circuitry 320, the example sample classification circuitry 325, the example malware family classification circuitry 330, the example post-process visualization circuitry 335, and/or, more generally, the example raw byte classification circuitry 300 of FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example input receiving circuitry 305, the example pre-process visualization circuitry 310, the example neural network training circuitry 315, the example feature extraction circuitry 320, the example sample classification circuitry 325, the example malware family classification circuitry 330, the example post-process visualization circuitry 335, and/or, more generally, the example raw byte classification circuitry 300 of FIG. 3 is/are hereby expressly defined to include a non-transitory computer readable storage device or storage disk such as a memory, a digital versatile disk (DVD), a compact disk (CD), a Blu-ray disk, etc., including the software and/or firmware. Further still, the example raw byte classification circuitry 300 of FIG. 3 may include one or more elements, processes, and/or devices in addition to, or instead of, those illustrated in FIG. 3, and/or may include more than one of any or all of the illustrated elements, processes and devices.

Figure 4:
FIG. 4 is a representation of deduplication family data prevalence for malware family classification.

FIG. 4 is a representation of deduplicated family data prevalence 400. Once classification of the raw byte & labels input 102 is performed by the CNN 104 of FIGS. 1A-1C and the accompanying neural network architecture 200, results of malware and/or clean family classification of samples is shown. The deduplicated family data prevalence 400 shows a sample count 402 and a sample type 404. In examples disclosed herein, the sample type 404 refers to the identified family of the malware sample. For example, the deduplicated family data prevalence 400 shows a set of clean samples 406, a set of Agent Tesla malware samples 408, a set of Emotet malware samples 410, etc. Each of the families depicted in FIG. 4 represent example malware families that the CNN 104 of FIGS. 1A-1C identified for each of the input samples. In the example deduplicated family data prevalence 400 shown in FIG. 4, fifteen thousand and one hundred malware samples and eight hundred and sixty one clean samples are depicted, along with the seven most prevalent malware families.

Figure 5A:
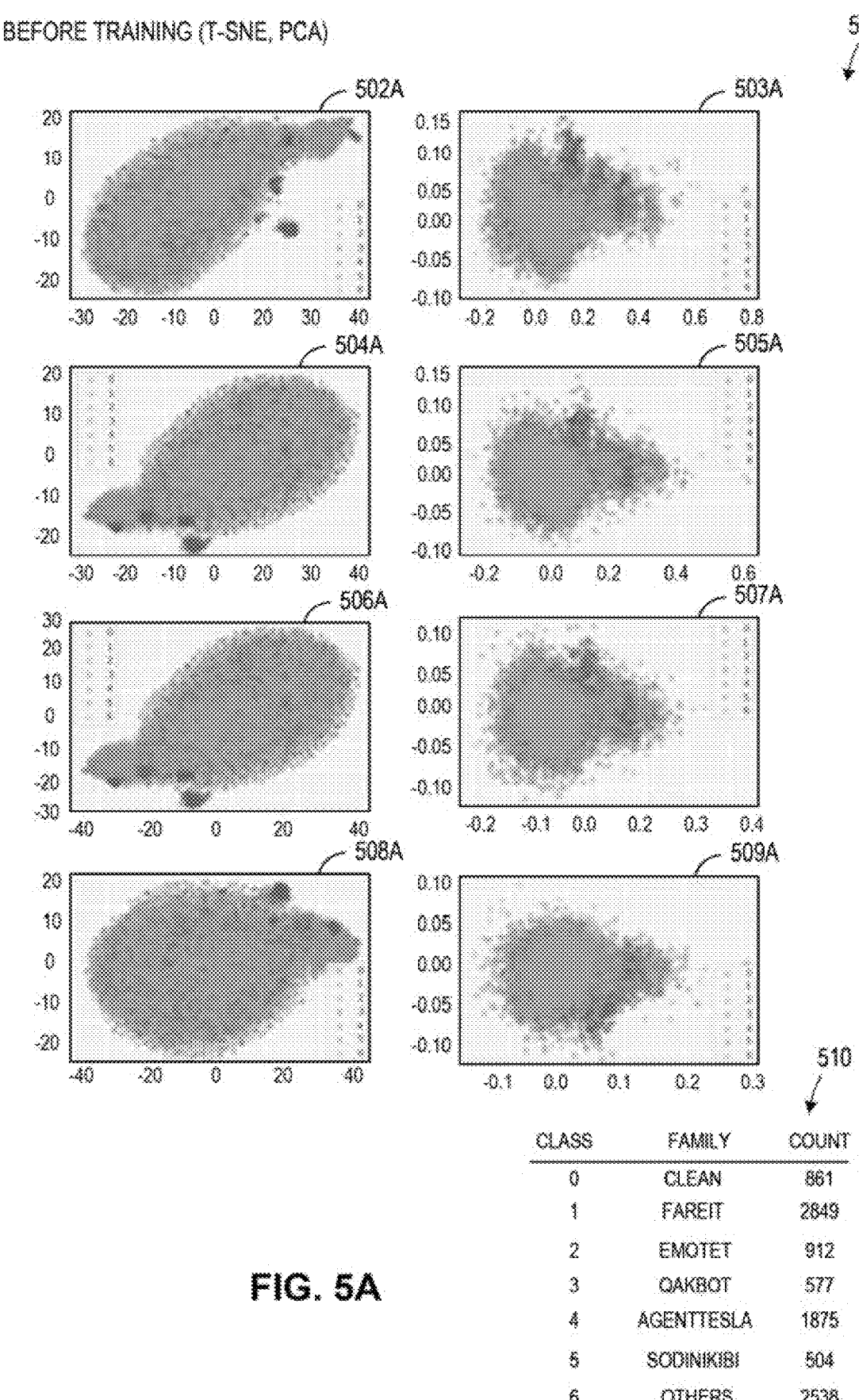
FIGS. 5A and 5B depict example t-Distributed Stochastic Neighbor Embedding (t-SNE) and Principal Component Analysis (PCA) pre-training and post-training plots.

FIG. 5A shows example t-Distributed Stochastic Neighbor Embedding (t-SNE) and Principal Component Analysis (PCA) pre-training plots 500A. The pre-training plots 500A visualize the outputs of the last convolutional layer of the set of second convolutional layers 208 of FIG. 2 and the set of fully connected layers 202 of FIG. 2 before training. The first, second, third, and fourth pre-training t-SNE plots, 502A, 504A, 506A, and 508A, respectively, show a distribution of data samples, where identification of malware family samples vs. clean samples is unclear. The first, second, third, and fourth pre-training PCA plots 503A, 505A, 507A, and 509A, respectively, also show an unclear distribution of data samples as malware and/or clean, prior to training. The example data table 510 shows the data depicted in the pre-training plots 500A.

Figure 5B:
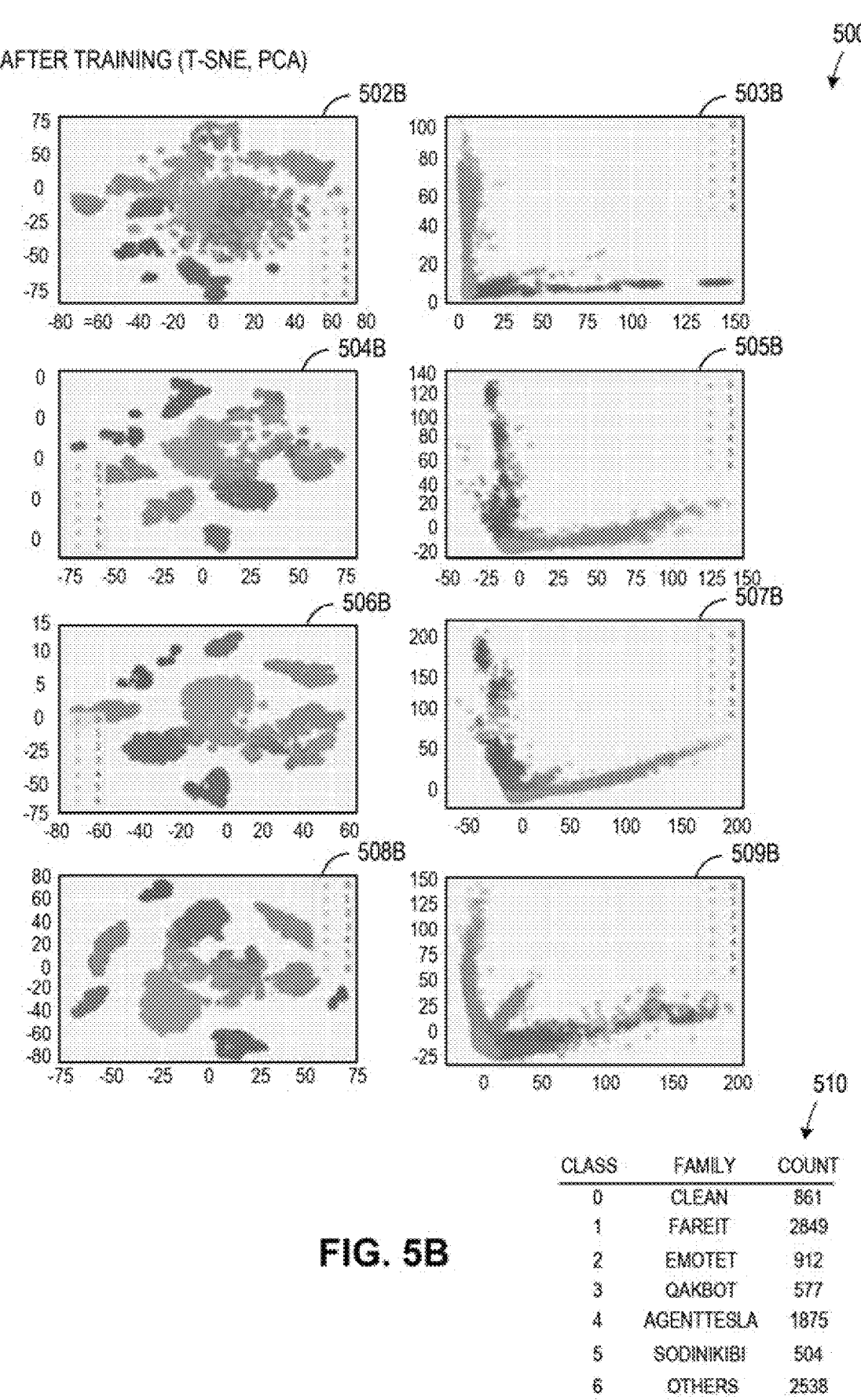

FIG. 5B shows example t-Distributed Stochastic Neighbor Embedding (t-SNE) and Principal Component Analysis (PCA) post-training plots 500B. The post-training plots 500B visualize the outputs of the last convolutional layer of the set of second convolutional layers 208 of FIG. 2 and the set of fully connected layers 202 of FIG. 2 before training. The first, second, third, and fourth post-training t-SNE plots, 502B, 504B, 506B, and 508B, respectively, show a distribution of data samples, where identification of malware family samples vs. clean samples is clear. The first, second, third, and fourth post-training PCA plots 503B, 505B, 507B, and 509B, respectively, also show a clear distribution of data samples as malware and/or clean, after training has occurred on the CNN 104 of FIGS. 1A-1C.

Figures 6A, 6B:
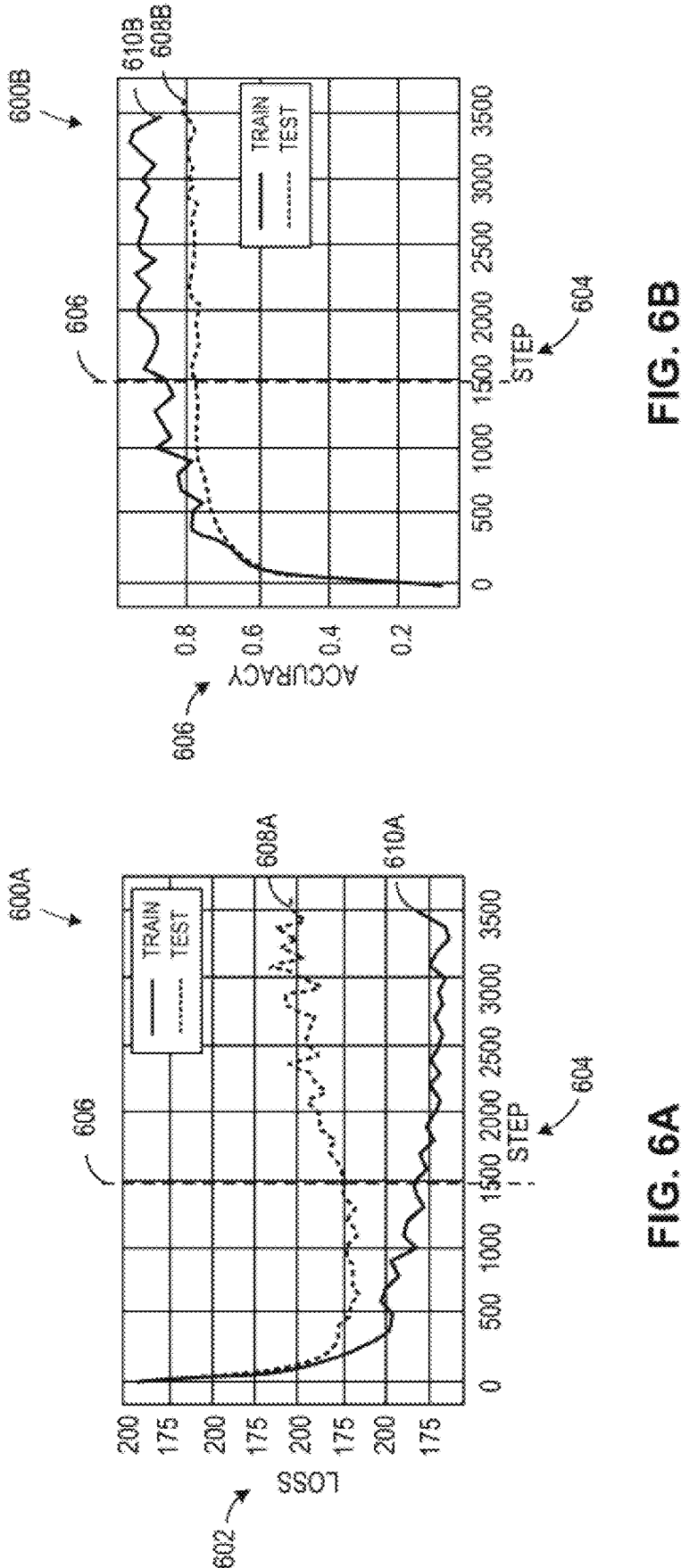
FIGS. 6A and 6B depict example learning curves for malware classification.

FIG. 6A depicts an example first learning curve 600A for malware classification. The example first learning curve 600A includes a loss 602 and step 604, as well as a position 606 and shows the training loss 608A and the testing loss 610A. As depicted in the first learning curve 600A, both the training loss 608A and the testing loss 610A are decreasing as the step 604 is progressing, relative to the position 606, which indicates good performance of the learning algorithm.

FIG. 6B depicts an example second learning curve 600B for malware classification. The example second learning curve 600B includes an accuracy 606 and step 604, as well as position 606 and shows training accuracy 608B and testing accuracy 610B. As depicted in the second learning curve 600B, both the training accuracy 608B and the testing accuracy 610B are increasing as the step 604 is progressing, relative to the position 606, which also indicates good performance of the learning algorithm.

FIG. 7 shows a last-layer t-SNE plot 700 visualizing the output of the CNN 104 of FIGS. 1A-1C after training is complete. FIG. 7 also includes the data table 510 of FIGS. 5A and 5B, with the last-layer t-SNE plot 700 showing identification of malware families relative to the data represented in the data table 510. For example, the last-layer t-SNE plot 700 shows clear distinction between malware families and/or clean samples in the plot, such as the Fareit family 702, the Agent Tesla family 704, and the Others family 706 (as shown in both the data table 510 and the last-layer t-SNE plot 700). Thus, clear classification of the samples is able to be performed after training is complete on the CNN 104 of FIGS. 1A-1C.

Figure 8:
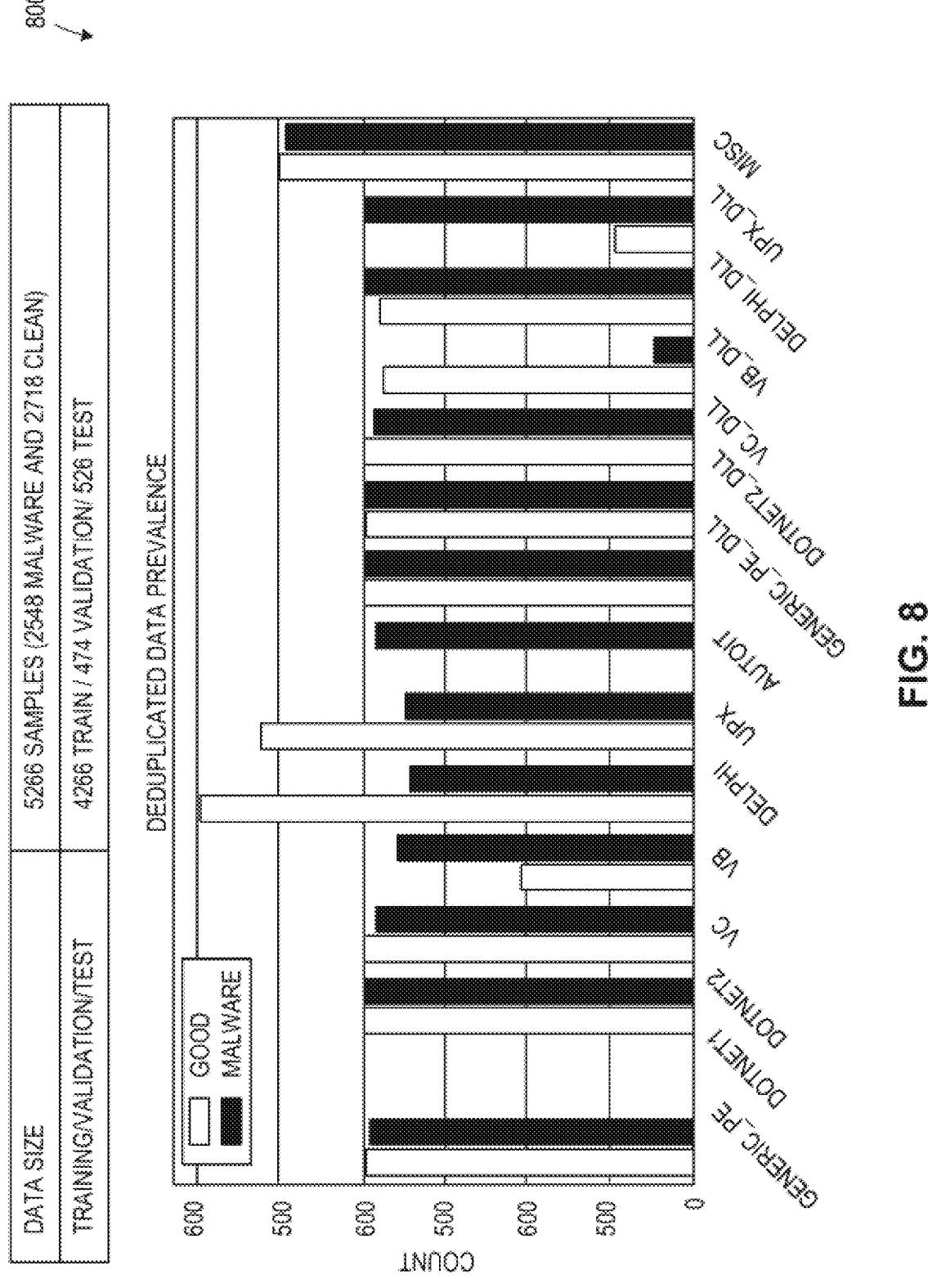
FIG. 8 depicts deduplicated data prevalence across file types for binary classification.

FIG. 8 shows deduplicated data prevalence across file types 800. The deduplicated data prevalence across file types 800 includes clean vs. malware classification indicators to show whether a given data sample is clean or malicious.

Figure 9:
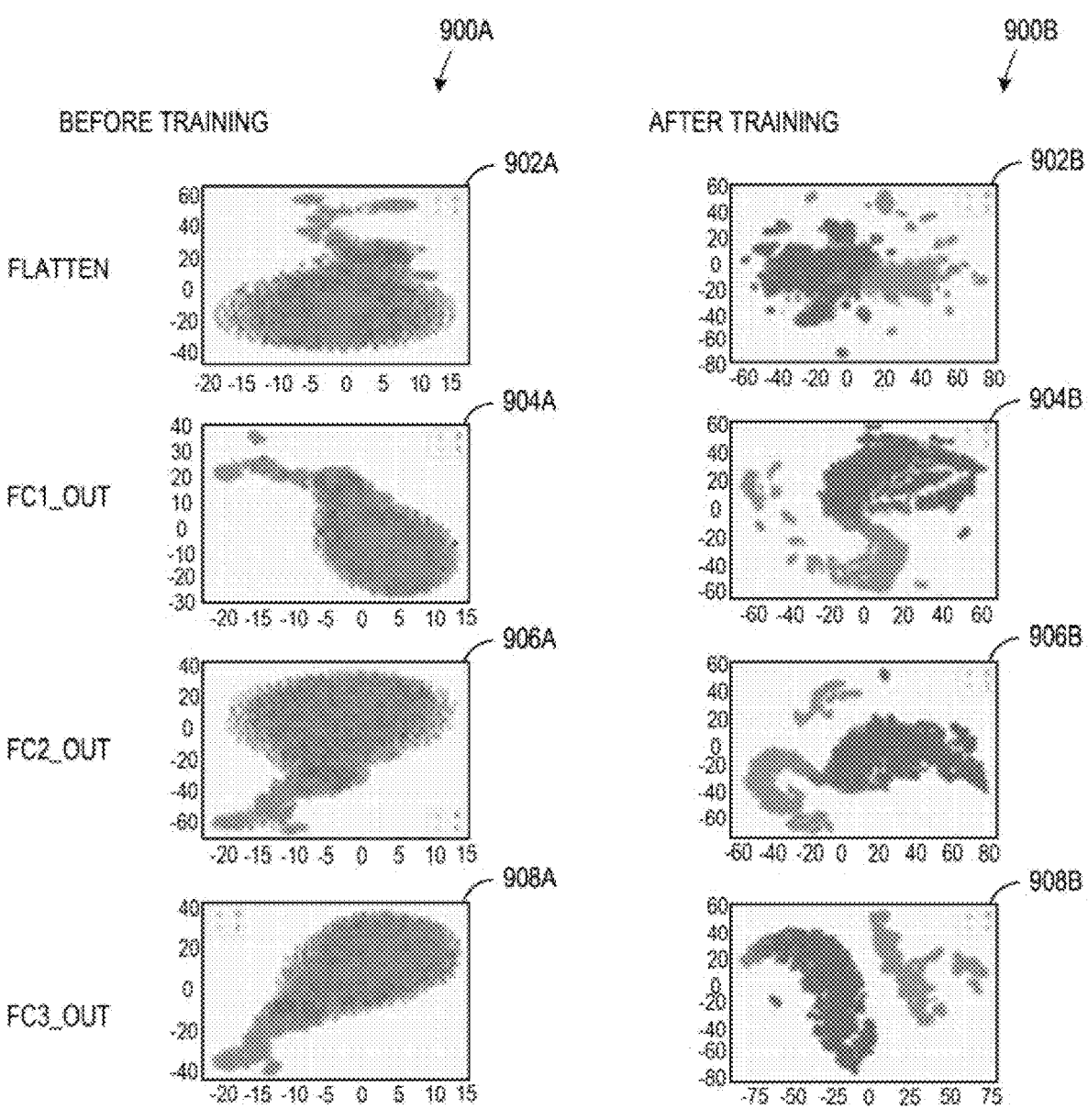
FIG. 9 shows example t-Distributed Stochastic Neighbor Embedding (t-SNE) pretraining and post training plots for binary classification.

FIG. 9 shows example t-Distributed Stochastic Neighbor Embedding (t-SNE) pretraining and post training plots for binary classification, 900A and 900B, respectively. The pre-training binary plots 900A include first, second, third, and fourth, pre-training plots 902A, 904A, 906A, and 908A, and the post-training binary plots 900B include first, second, third, and fourth, post-training plots 902B, 904B, 906B, and 908B, respectively. The pre-training binary plots 900A show a visualization of received raw byte data samples prior to training of the CNN 104 of FIGS. 1A-1C. As shown, the data prior to training proves difficult to distinguish between malware and clean samples for binary classification. The post-training binary plots 900B show a clear distinction between clean and malware samples for binary classification, showing that training and use of the neural network (e.g., CNN 104 of FIG. 1) is effective in facilitating binary classification of raw data samples as either malware or clean.

Figures 10A, 10B:
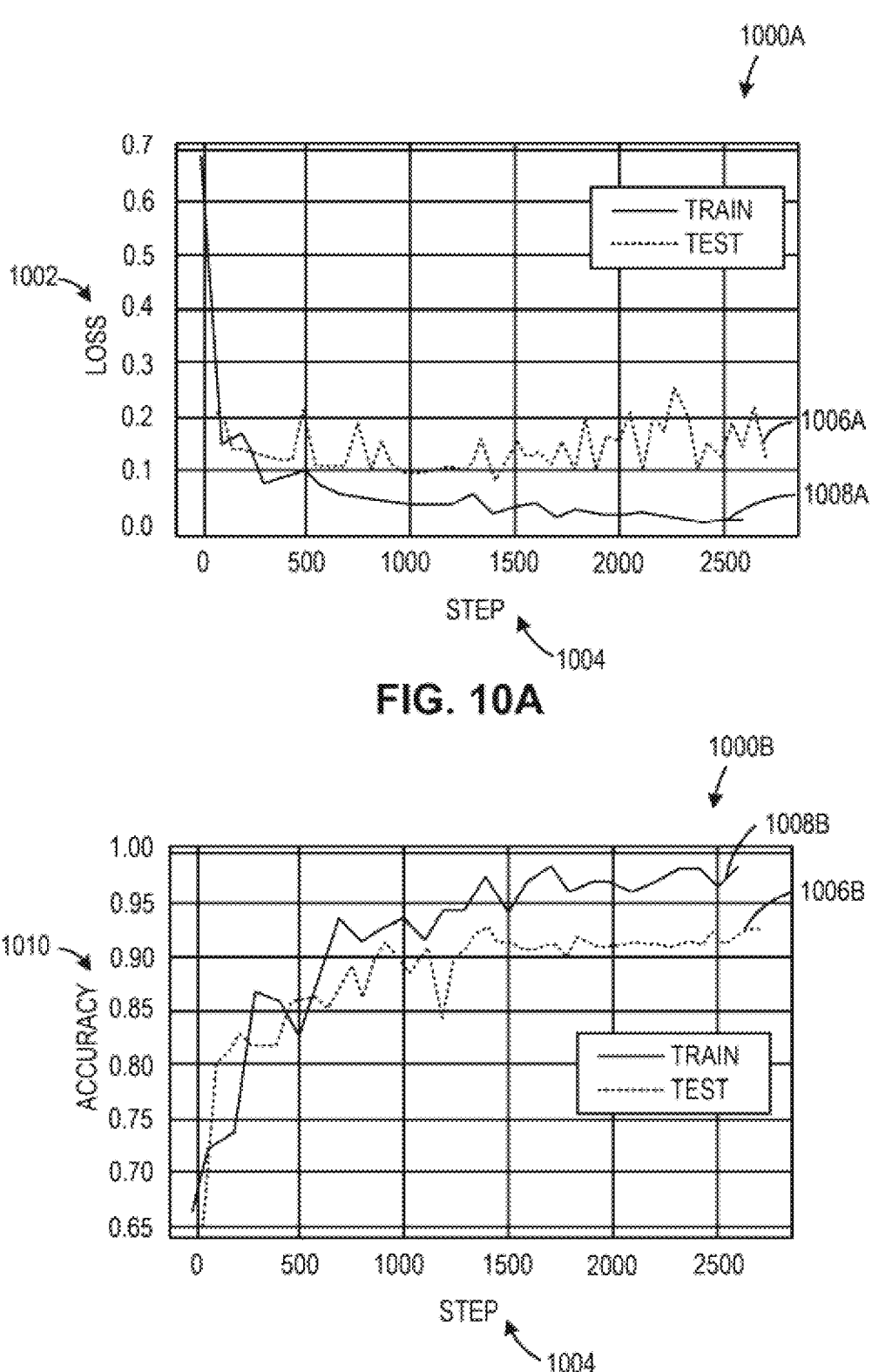
FIGS. 10A and 10B illustrate example first and second binary learning curves for binary classification.

FIG. 10A depicts an example first binary learning curve 1000A for binary classification. The example first binary learning curve 1000A includes a binary loss 1002 and binary step 1004 and shows the binary training loss 1006A and the binary testing loss 1008A. As depicted in the first binary learning curve 1000A, both the binary training loss 1006A and the binary testing loss 1008A are decreasing as the binary step 1005 is progressing, which indicates good performance of the learning algorithm.

FIG. 10B depicts an example second binary learning curve 1000B for binary classification. The example second binary learning curve 1000B includes a binary accuracy 1010 and binary step 1004 and shows binary training accuracy 1008B and binary testing accuracy 1006B. As depicted in the second binary learning curve 1000B, both the binary training accuracy 1008A and the binary testing accuracy 1006B are increasing as the binary step 1004 is progressing, which also indicates good performance of the learning algorithm.

Figure 11:
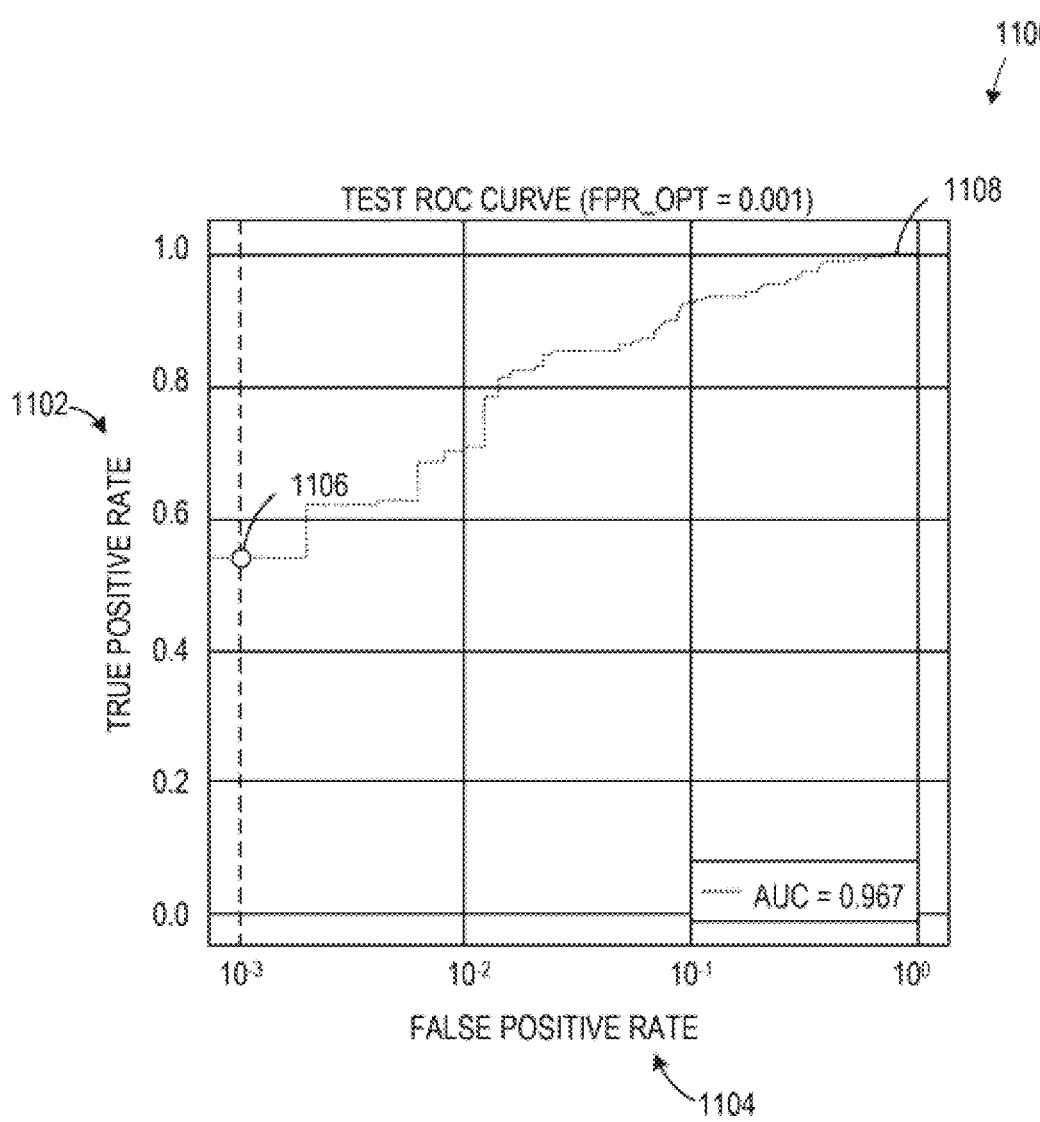
FIG. 11 shows an example Receiver Operating Characteristic (ROC) curve indicating classification performance of the neural network.

FIG. 11 shows an example Receiver Operating Characteristic (ROC) curve 1100. The ROC curve 1100 shows performance of the CNN 104 of FIGS. 1A-1C in deployment, through measurement of a true positive rate 1102 and a false positive rate 1104 of binary classification of data samples. An operating point 1106 is shown, with the curve 1108 progressing relative to this operating point 1106, and the area under the curve (AUC), which represents an evaluation metric for performance of a binary classifier is shown to be 0.967, which indicates excellent performance.

Figures 12A, 12B, 12C:
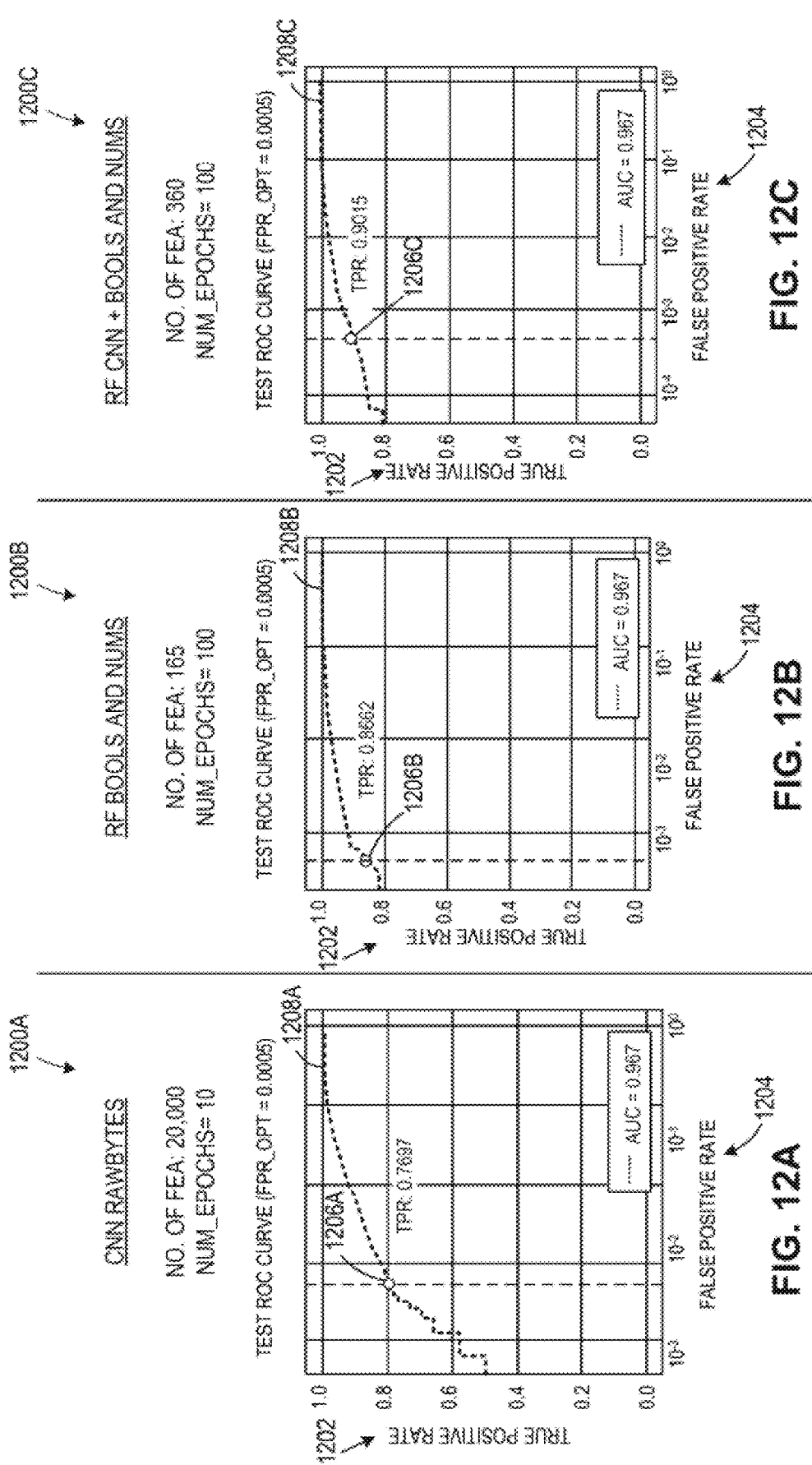
FIGS. 12A-12C show example first, second, and third ROC curves for different data sample inputs.

FIGS. 12A-12C show example first, second, and third ROC curves, 1200A, 1200B, and 1200C, respectively for different data sample inputs. Example first, second, and third operating points 1206A, 1206B, and 1206C, respectively, are shown, with first, second, and third curves 1208A, 1208B, and 1208C, respectively progressing to show the example true positive rate 1202 against the false positive rate 1204. The AUC of each of these first, second, and third ROC curves, 1200A, 1200B, and 1200C, respectively, show excellent classification performance of the trained CNN 104.

Figure 13:
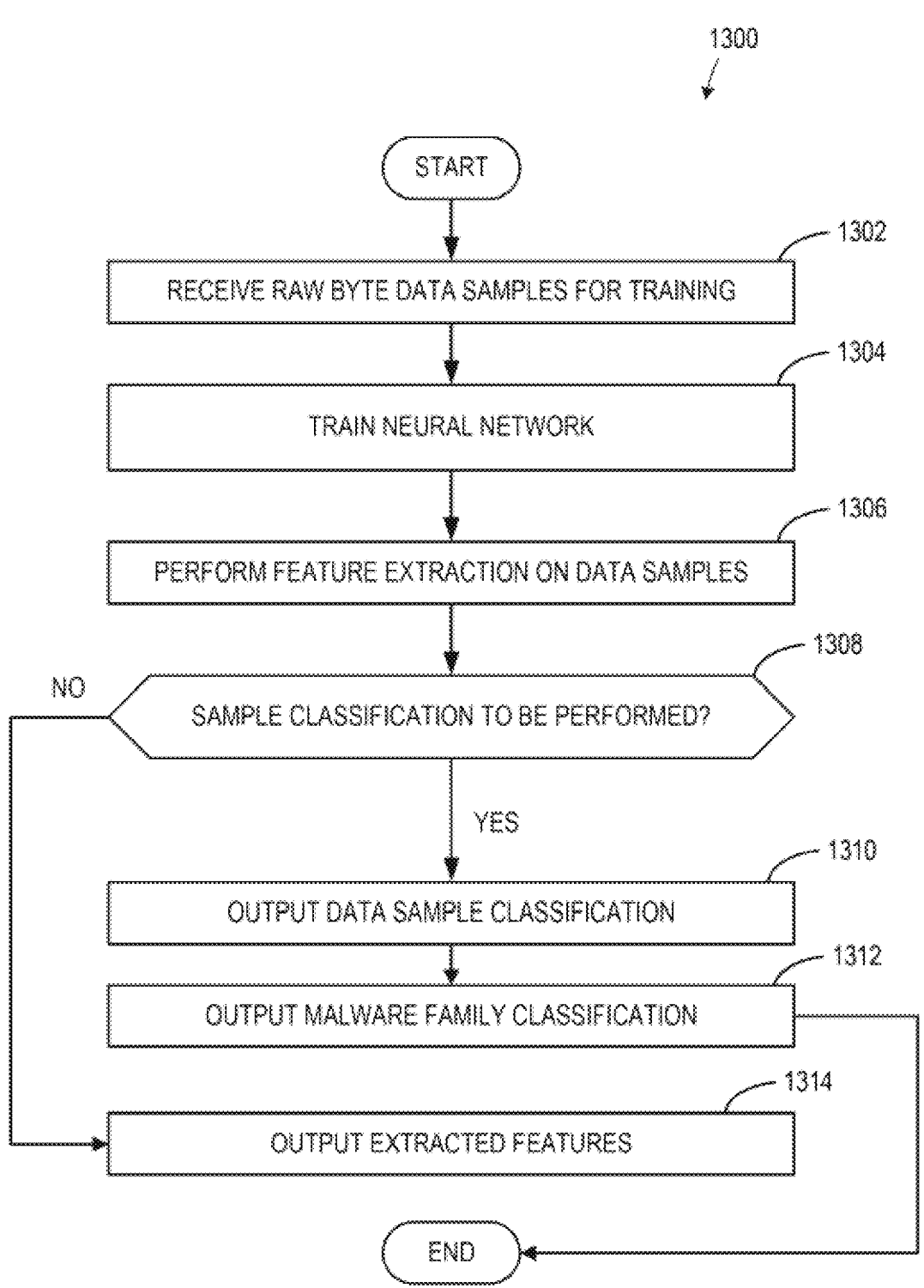
FIG. 13 is a flowchart representative of example machine readable instructions that may be executed by example processor circuitry to implement the example raw byte classification circuitry of FIG. 3, in accordance with the teachings of this disclosure.

A flowchart representative of example hardware logic circuitry, machine readable instructions, hardware implemented state machines, and/or any combination thereof for implementing the raw byte classification circuitry 300 of FIG. 3 is shown in FIG. 13. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flow-chart illustrated in FIG. 13, many other methods of implementing the example raw byte classification circuitry 300 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

A flowchart representative of example hardware logic circuitry, machine readable instructions, hardware implemented state machines, and/or any combination thereof for implementing the raw byte classification circuitry 300 of FIG. 3 is shown in FIG. 13. The machine readable instructions may be one or more executable programs or portion(s) of an executable program for execution by processor circuitry, such as the processor circuitry 1412 shown in the example processor platform 1400 discussed below in connection with FIG. 9 and/or the example processor circuitry discussed below in connection with FIGS. 10A, 10B, and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flow-chart illustrated in FIG. 13, many other methods of implementing the example raw byte classification circuitry 300 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 13 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 13 is a flowchart representative of example machine readable instructions and/or example operations 1300 that may be executed and/or instantiated by processor circuitry to receive, classify, and output the classification result of an unknown data sample. The machine readable instructions and/or operations 1300 of FIG. 13 begin at block 1302, at which the input receiving circuitry 305 of FIG. 3 accesses an unclassified raw byte sample for classification.

At block 1302, the example input receiving circuitry 305 receives raw byte data samples as input for training of a neural network (e.g., CNN 104 of FIGS. 1A-1C). In examples disclosed herein, the data samples may be obtained from a database such as the data samples database 302 of FIG. 3, however, any other data source may be utilized.

At block 1304, the example neural network training circuitry 315 trains the neural network. In examples disclosed herein, any type of neural network training algorithm may be used to train the neural network.

At block 1306, the example feature extraction circuitry 320 performs feature extraction on the data samples obtained by the input receiving circuitry 305 at block 1302. In examples disclosed herein, any type of traditional feature-based classifier may be used to perform feature extraction on data samples.

At block 1308, the example sample classification circuitry 325 determines whether classification is to be performed on the data samples using the extracted features from block 1306. If the sample classification circuitry 325 determines that classification is to be performed, the process moves to block 1310. However, if the sample classification circuitry 325 determines that classification is not to be performed, the process moved forward to block 1314.

At block 1310, the example sample classification circuitry 325 performs and outputs binary classification of data samples (e.g., clean or malicious).

At block 1312, the example malware family classification circuitry 330 performs and outputs malware family classification of data samples (e.g., clean or malware family).

At block 1314, the example feature extraction circuitry 320 outputs the extracted features from the data samples (e.g., for use in another machine learning (ML) model, etc.), as performed at block 1306.

Figure 14:
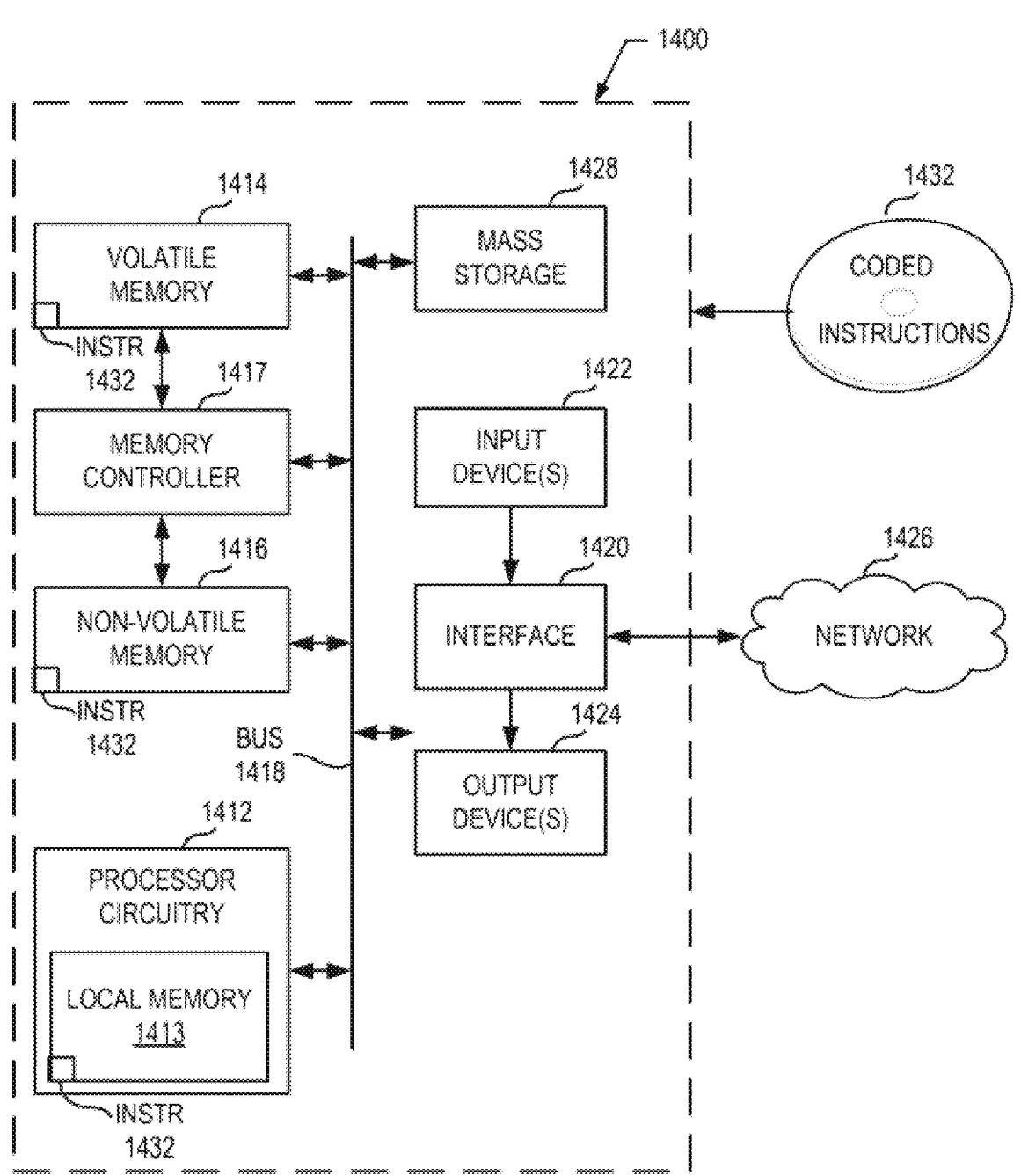
FIG. 14 is a block diagram of an example processing platform including processor circuitry structured to execute the example machine readable instructions of FIG. 13 to implement the raw byte classification circuitry 300 of FIG. 3.

FIG. 14 is a block diagram of an example processor platform 1400 structured to execute and/or instantiate the machine readable instructions and/or operations of FIG. 13 to implement the raw byte classification system 100 of FIG. 1. The processor platform 1400 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the example raw byte classification circuitry 300 of FIG. 3.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1440 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIG. 13, may be stored in the mass storage device 1428, in the volatile memory 1414, in the non-volatile memory 1416, and/or on a removable non-transitory computer readable storage medium such as a CD or DVD.

Figure 15:
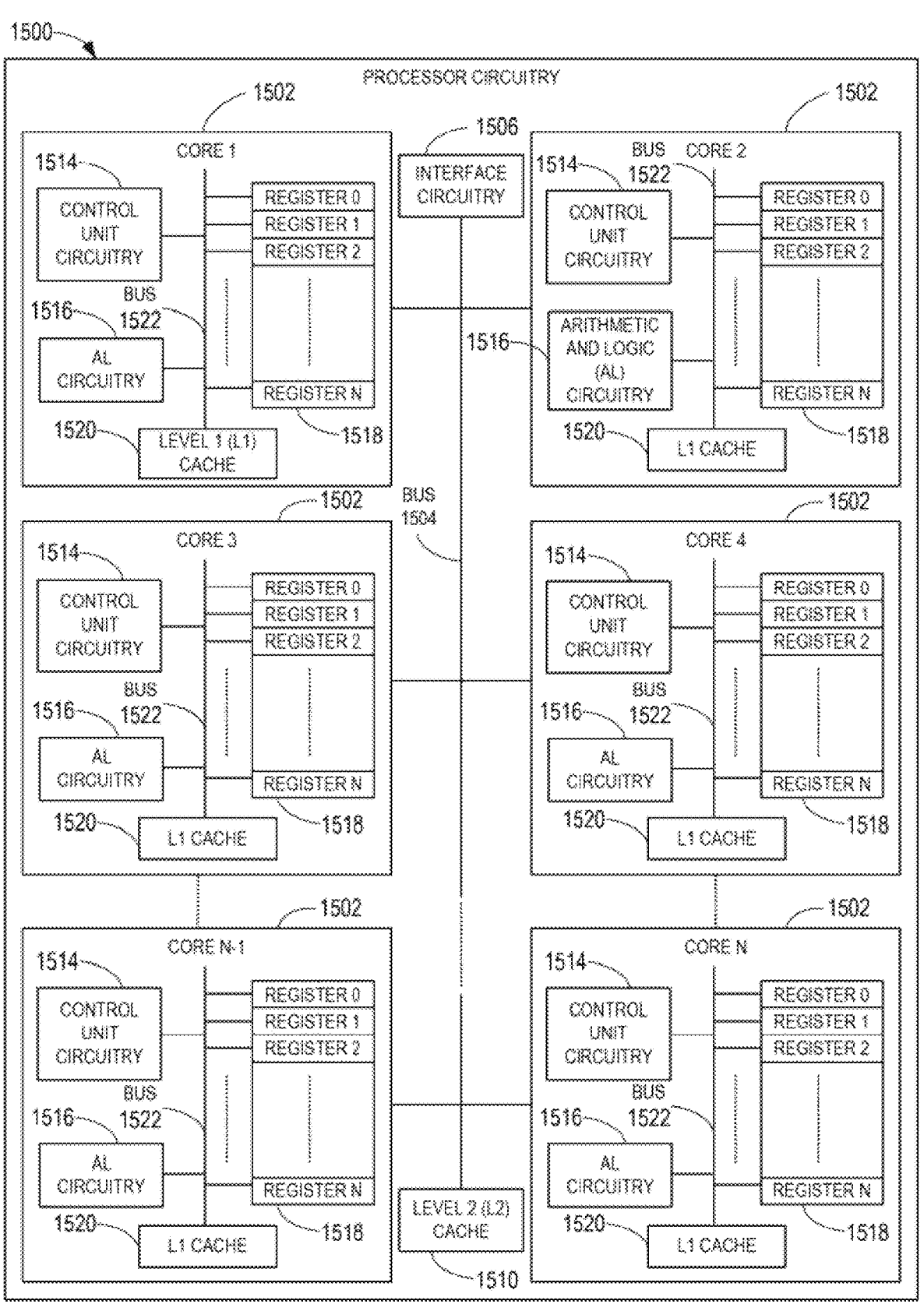
FIG. 15 is a block diagram of an example implementation of the processor circuitry of FIG. 14.

FIG. 15 is a block diagram of an example implementation of the processor circuitry 1425 of FIG. 14. In this example, the processor circuitry 1425 of FIG. 14 is implemented by a microprocessor 1500. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowchart of FIG. 13.

The cores 1502 may communicate by an example first bus 1504. In some examples, the first bus 1504 may implement a communication bus to effectuate communication associated with one(s) of the cores 1502. For example, the first bus 1504 may implement at least one of an Inter-Integrated Circuit (I2C) bus, a Serial Peripheral Interface (SPI) bus, a PCI bus, or a PCIe bus. Additionally or alternatively, the first bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2_cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1415, 1420 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and an example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register (s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The second bus 1522 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
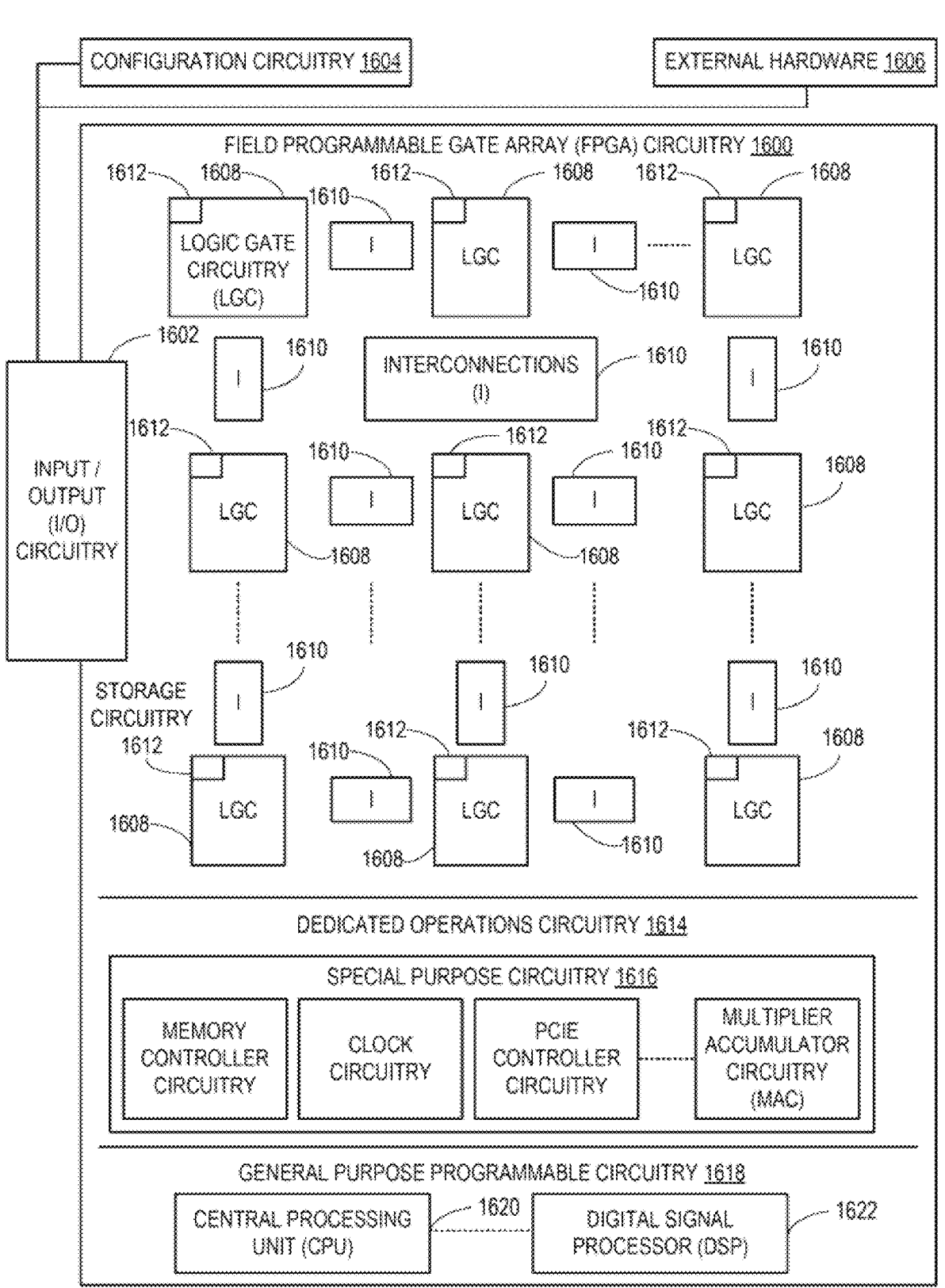
FIG. 16 is a block diagram of another example implementation of the processor circuitry of FIG. 14.

FIG. 16 is a block diagram of another example implementation of the processor circuitry 1425 of FIG. 14. In this example, the processor circuitry 1425 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowchart of FIG. 13 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowchart of FIG. 13 In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowchart of FIG. 13. As such, the FPGA circuitry 1600 may be structured to effectively instantiate some or all of the machine readable instructions of the flowchart of FIG. 13 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIG. 13 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIG. 13 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1425 of FIG. 14, many other approaches are contemplated. For example, as mentioned above, modern FPGA circuitry may include an on-board CPU, such as one or more of the example CPU 1620 of FIG. 16. Therefore, the processor circuitry 1425 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowchart of FIG. 13 may be executed by one or more of the cores 1502 of FIG. 15 and a second portion of the machine readable instructions represented by the flowchart of FIG. 13 may be executed by the FPGA circuitry 1600 of FIG. 16.

In some examples, the processor circuitry 1425 of FIG. 14 may be in one or more packages. For example, the processor circuitry 1500 of FIG. 15 and/or the FPGA circuitry 1600 of FIG. 16 may be in one or more packages. In some examples, an XPU may be implemented by the processor circuitry 1425 of FIG. 14, which may be in one or more packages. For example, the XPU may include a CPU in one package, a DSP in another package, a GPU in yet another package, and an FPGA in still yet another package.

Figure 17:
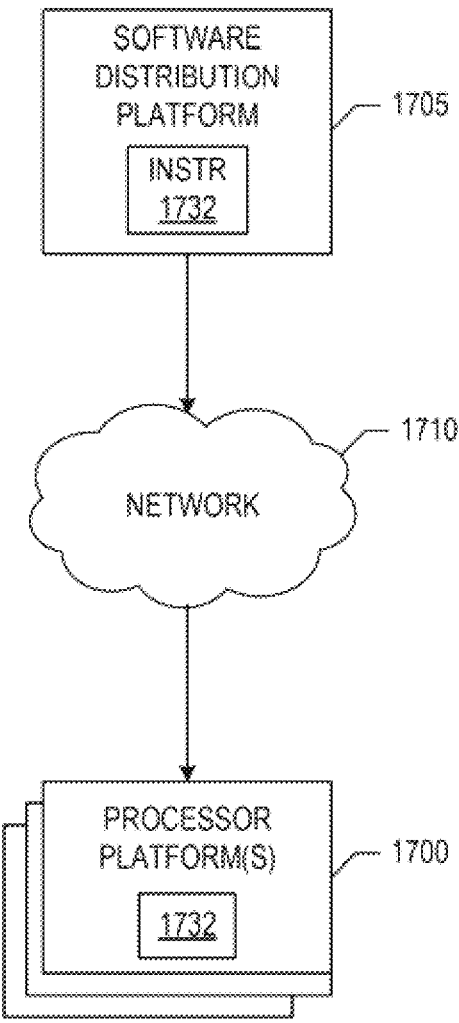
FIG. 17 is a block diagram of an example software distribution platform (e.g., one or more servers) to distribute software (e.g., software corresponding to the example machine readable instructions of FIG. 13) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine readable instructions 1732 of FIG. 17 to hardware devices owned and/or operated by third parties is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions represented by the flowchart of FIG. 13. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1732, which may correspond to the example machine readable instructions represented by the flowchart of FIG. 13, as described above. The one or more servers of the example software distribution platform 1705 are in communication with a network 1710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1732 from the software distribution platform 1705. For example, the software, which may correspond to the example machine readable instructions represented by the flowchart of FIG. 13 may be downloaded to the example processor platform 1700, which is to execute the machine readable instructions 1732 to implement the raw byte classification system 100 of FIG. 1. In some example, one or more servers of the software distribution platform 1705 periodically offer, transmit, and/or force updates to the software (e.g., the example machine readable instructions 1732 of FIG. 17) to ensure improvements, patches, updates, etc., are distributed and applied to the software at the end user devices.

Example methods, apparatus, systems, and articles of manufacture to augment classification coverage for low prevalence samples through neighborhood labels proximity vectors are disclosed herein. Further examples and combinations thereof include the following:

Example 1 includes an apparatus comprising at least one memory, instructions, and processor circuitry to execute the instructions to train a neural network with a plurality of raw byte data samples to obtain extracted features, perform feature extraction on ones of the plurality of raw byte data samples, determine whether ones of the plurality of raw byte data samples are clean or malicious using the extracted features, and determine a family of malware to which an identified malicious sample belongs.

Example 2 includes the apparatus of example 1, wherein a feature-based classifier is used to determine whether the ones of the plurality of raw byte data are clean or malicious.

Example 3 includes the apparatus of example 1, wherein a feature-based classifier is used to determine the family of malware to which the identified malicious sample belongs.

Example 4 includes the apparatus of example 1, wherein the extracted features are output for use in another machine learning (ML) model prior to classification.

Example 5 includes the apparatus of example 1, wherein the neural network is trained using a supervised learning algorithm such as one or more of a Regression, Decision Tree, Random forest, KNN, or Logistic Regression algorithm.

Example 6 includes the apparatus of example 1, wherein the raw byte data samples include both clean and malicious samples.

Example 7 includes the apparatus of example 1, wherein the plurality of raw byte data samples is deduplicated prior to use in training of the neural network.

Example 8 includes a non-transitory computer readable medium comprising a plurality of instructions that, when executed, cause a machine to at least train a neural network with a plurality of raw byte data samples, perform feature extraction on ones of the plurality of raw byte data samples to obtain extracted features, determine whether ones of the plurality of raw byte data samples are clean or malicious using the extracted features, and determine a family of malware to which an identified malicious sample belongs.

Example 9 includes the non-transitory computer readable medium of example 8, wherein a feature-based classifier is used to determine whether the ones of the plurality of raw byte data are clean or malicious.

Example 10 includes the non-transitory computer readable medium of example 8, wherein a feature-based classifier is used to determine the family of malware to which the identified malicious sample belongs.

Example 11 includes the non-transitory computer readable medium of example 8, wherein the extracted features are output for use in another machine learning (ML) model prior to classification.

Example 12 includes the non-transitory computer readable medium of example 8, wherein the neural network is trained using a supervised learning algorithm such as one or more of a Regression, Decision Tree, Random forest, KNN, or Logistic Regression algorithm.

Example 13 includes the non-transitory computer readable medium of example 8, wherein the raw byte data samples include both clean and malicious samples.

Example 14 includes the non-transitory computer readable medium of example 8, wherein the plurality of raw byte data samples is deduplicated prior to use in training of the neural network.

Example 15 includes a method to perform malware classification through convolutional neural networks using raw bytes, the method comprising training a neural network with a plurality of raw byte data samples, performing feature extraction on ones of the plurality of raw byte data samples to obtain extracted features, determining whether ones of the plurality of raw byte data samples are clean or malicious using the extracted features, and determining a family of malware to which an identified malicious sample belongs.

Example 16 includes the method of example 15, wherein a feature-based classifier is used to determine whether the ones of the plurality of raw byte data are clean or malicious.

Example 17 includes the method of example 15, wherein a feature-based classifier is used to determine the family of malware to which the identified malicious sample belongs.

Example 18 includes the method of example 15, wherein the extracted features are output for use in another machine learning (ML) model prior to classification.

Example 19 includes the method of example 15, wherein the neural network is trained using a supervised learning algorithm such as one or more of a Regression, Decision Tree, Random forest, KNN, or Logistic Regression algorithm.

Example 20 includes the method of example 15, wherein the raw byte data samples include both clean and malicious samples.

Example 21 includes the method of example 15, wherein the plurality of raw byte data samples is deduplicated prior to use in training of the neural network.

Example 22 includes an apparatus to perform malware classification through convolutional neural networks using raw bytes comprising interface circuitry, processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the one or more first operations, the one or more second operations or the one or more third operations to instantiate neural network training circuitry to train a neural network with a plurality of raw byte data samples, feature extraction circuitry to perform feature extraction on ones of the plurality of raw byte data samples to obtain extracted features, sample classification circuitry to determine whether ones of the plurality of raw byte data samples are clean or malicious using the extracted features, and malware family classification circuitry to determine a family of malware to which an identified malicious sample belongs. It is noted that this patent claims priority from U.S. Provisional Patent Application No. 63/170,647, which was filed on Apr. 5, 2021, and is hereby incorporated by reference in its entirety.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
at least one memory;
instructions; and
at least one processor circuit to execute the instructions to:
train a first neural network with a plurality of raw byte data samples, wherein the plurality of raw byte data samples include both clean and malicious samples, wherein the plurality of raw byte data samples are not preprocessed;
perform feature extraction using one or more raw byte data samples of the plurality of raw byte data samples and a rectified linear unit (RELU) to obtain extracted features, the extracted features including malware static features;
determine whether the one or more raw byte data samples of the plurality of raw byte data samples are clean or malicious using the extracted features; and
provide the malware static features as input to a second neural network to determine a family of malware to which an identified malicious sample belongs by using a scaled exponential linear unit (SELU).

2. The apparatus of claim 1, wherein a feature-based classifier is used to determine whether the one or more raw byte data samples of the plurality of raw byte data samples are clean or malicious.

3. The apparatus of claim 1, wherein a feature-based classifier is used to determine the family of malware to which the identified malicious sample belongs.

4. The apparatus of claim 1, wherein the first neural network is trained using a supervised learning algorithm such as one or more of a Regression, Decision Tree, Random forest, k-nearest neighbors (KNN), or Logistic Regression algorithm.

5. The apparatus of claim 1, wherein the plurality of raw byte data samples is deduplicated prior to use in training of the first neural network.

6. The apparatus of claim 1, wherein the RELU is used as a nonlinear activation function for learning a set of first and second convolutional layers of the first neural network.

7. The apparatus of claim 1, wherein the SELU is used as a nonlinear activation function for learning a set of fully connected layers of a feature-based classifier.

8. A non-transitory computer readable medium comprising a plurality of instructions that, when executed, cause a machine to at least:

train a first neural network with a plurality of raw byte data samples, the plurality of raw byte data samples include both clean and malicious samples, the plurality of raw byte data samples are not preprocessed;

perform feature extraction using one or more raw byte data samples of the plurality of raw byte data samples and a rectified linear unit (RELU) to obtain extracted features, the extracted features including malware static features;

determine whether the one or more raw byte data samples of the plurality of raw byte data samples are clean or malicious using the extracted features; and provide the malware static features as input to a second neural network to determine a family of malware to which an identified malicious sample belongs by using a scaled exponential linear unit (SELU).

9. The non-transitory computer readable medium of claim 8, wherein a feature-based classifier is used to determine whether the one or more raw byte data samples of the plurality of raw byte data samples are clean or malicious.

10. The non-transitory computer readable medium of claim 8, wherein a feature-based classifier is used to determine the family of malware to which the identified malicious sample belongs.

11. The non-transitory computer readable medium of claim 8, wherein the first neural network is trained using a supervised learning algorithm such as one or more of a Regression, Decision Tree, Random forest, k-nearest neighbors (KNN), or Logistic Regression algorithm.

12. The non-transitory computer readable medium of claim 8, wherein the plurality of raw byte data samples is deduplicated prior to use in training of the first neural network.

13. The non-transitory computer readable medium of claim 8, wherein the RELU is used as a nonlinear activation function for learning a set of first and second convolutional layers of the first neural network.

14. A method to perform malware classification through convolutional neural networks using raw bytes, the method comprising:

training a first neural network with a plurality of raw byte data samples, the plurality of raw byte data samples include both clean and malicious samples, the plurality of raw byte data samples are not preprocessed;

performing feature extraction using one or more raw byte data samples of the plurality of raw byte data samples and a rectified linear unit (RELU) to obtain extracted features, the extracted features including malware static features;

determining whether the one or more raw byte data samples of the plurality of raw byte data samples are clean or malicious using the extracted features; and providing the malware static features as input to a second neural network to determine a family of malware to which an identified malicious sample belongs by using a scaled exponential linear unit (SELU).

15. The method of claim 14, wherein a feature-based classifier is used to determine whether the one or more raw byte data samples of the plurality of raw byte data samples are clean or malicious.

16. The method of claim 14, wherein a feature-based classifier is used to determine the family of malware to which the identified malicious sample belongs.

17. The method of claim 14, wherein the first neural network is trained using a supervised learning algorithm such as one or more of a Regression, Decision Tree, Random forest, k-nearest neighbors (KNN), or Logistic Regression algorithm.

18. The method of claim 14, wherein the plurality of raw byte data samples is deduplicated prior to use in training of the first neural network.

19. The method of claim 14, wherein the RELU is used as a nonlinear activation function for learning a set of first and second convolutional layers of the first neural network.

20. An apparatus to perform malware classification through convolutional neural networks using raw bytes comprising:

interface circuitry; and processor circuitry including one or more of:

at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus;

a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrated Circuitry (ASIC) including logic gate circuitry to perform one or more third operations;

the processor circuitry to perform at least one of the one or more first operations, the one or more second operations or the one or more third operations to instantiate:

neural network training circuitry to train a first neural network with a plurality of raw byte data samples, the plurality of raw byte data samples include both clean and malicious samples, the plurality of raw byte data samples are not preprocessed;

feature extraction circuitry to perform feature extraction using one or more raw byte data samples of the plurality of raw byte data samples and a rectified linear unit (RELU) to obtain extracted features, the extracted features including malware static features;

sample classification circuitry to determine whether the one or more raw byte data samples of the plurality of raw byte data samples are clean or malicious using the extracted features; and malware family classification circuitry to determine a family of malware to which an identified malicious sample belongs and by using the malware static features as input to a second neural network and a scaled exponential linear unit (SELU).

21. The apparatus of claim 20, wherein the RELU is used as a nonlinear activation function for learning a set of first and second convolutional layers of the first neural network.

* * * * *